United States Patent [19]

Alenduff et al.

[11] Patent Number: 4,731,547
[45] Date of Patent: Mar. 15, 1988

[54] PEAK POWER SHAVING APPARATUS AND METHOD

[75] Inventors: Phillip D. Alenduff; Gregory J. Porter; Richard A. Crump, all of Lafayette, Ind.

[73] Assignee: Caterpillar Inc., Peoria, Ill.

[21] Appl. No.: 941,245

[22] Filed: Dec. 12, 1986

[51] Int. Cl.$^4$ .......................... H02J 1/00; H02J 3/40; F02N 11/06
[52] U.S. Cl. ........................................ 307/85; 307/44; 307/47; 307/68; 290/2; 290/40 R; 364/494
[58] Field of Search ..................... 307/85, 38, 62, 64, 307/44, 47, 67, 68, 86, 131; 364/492, 494; 290/2, 40 R, 30 R, 30 A, 30 B, 4 R; 219/279

[56] References Cited

U.S. PATENT DOCUMENTS

| | | | |
|---|---|---|---|
| 3,678,284 | 7/1972 | Peters | 290/30 X |
| 3,906,242 | 9/1975 | Stevenson | 307/38 |
| 4,023,043 | 5/1977 | Stevenson | 307/38 |
| 4,039,846 | 8/1977 | Vance | 290/4 R X |
| 4,150,300 | 4/1979 | Van Winkle | 290/4 R X |
| 4,262,209 | 4/1981 | Berner | 290/2 X |
| 4,577,280 | 3/1986 | Putman | 364/494 |

OTHER PUBLICATIONS

Technical Section 9 of Catalog 1100 of Automatic Switch Co. titled "ASCO Power Control Systems".
Shaving Electrical Power Costs—The Economics of Cummins Peak Shaving Systems, Bulletin No. 3382355, dated revision Nov. 1984.

Primary Examiner—William M. Shoop, Jr.
Assistant Examiner—Sharon D. Logan
Attorney, Agent, or Firm—Stephen L. Noe

[57] ABSTRACT

Utility charges associated with peak electrical power demands constitute an increasing portion of utility bills associated with large commercial consumers of electricity. The instant invention provides an apparatus for reducing the peak electrical demand of a predetermined user operational unit from an electrical power distribution network by controllably operating at least one secondary electrical generator associated with the operational unit in parallel with the utility power distribution network. The secondary electrical generator includes a switch for connecting the generator in parallel with the utility network in response to receiving a transfer command signal. A transducer senses the actual peak power demand of the operational unit from the utility network and produces a demand signal having a value responsive to the sensed actual peak power demand. A memory element controllably stores a plurality of control parameters including a demand setpoint value. A logic device controllably produces the transfer command signal and connects the secondary electrical generator in parallel with the utility distribution network in response to the value of the demand signal exceeding the value of the demand setpoint. The logic device controls the secondary electrical generator to produce only the amount of power necessary to maintain the demand signal at or below the demand setpoint value.

38 Claims, 9 Drawing Figures

PEAK POWER SHAVING APPARATUS AND METHOD

DESCRIPTION

TECHNICAL FIELD

This invention relates generally to an apparatus and method for reducing peak power demands from an electrical utility and, more particularly, to an apparatus and method for sensing peak electrical power demands and controllably operating a secondary electrical power generating set in parallel with the utility.

BACKGROUND ART

Users of large amounts of electrical power, such as industrial manufacturing facilities, typically consume such power at uneven rates. During peak periods of manufacturing activity, for example, during normal daylight working hours, such consumers require relatively large amounts of electrical power. During off-peak periods, for example, during night time hours, the amount of power consumed can decrease significantly. Seasonal variations in power consumption are also common. Despite these fluctuating demands for electrical power, electric utilities are required to maintain a generating capacity that exceeds the maximum demand for electricity anticipated during any given period of time. Therefore, electric utilities must maintain generating capacities far in excess of average electrical power requirements in order to meet such occasional and relatively short term demands. The formation and maintenance of such excess capacity is quite expensive, and dramatically increases the average cost of providing electrical power.

In order to better allocate the cost of providing excess power generation capacity to those consumers most requiring such capacity, and in order to encourage such consumers to more evenly distribute their demand for electrical power, the utility rate schedule applied to such consumers is typically divided into two components. The first component is an energy charge which reflects the utility's own energy generation and transmission costs. The charge is typically calculated in cents per kilowatt hour of energy consumed during a particular billing period. The second component is a peak demand charge which reflects the utility's capital costs, and is based on the average energy consumed by the customer during a predetermined demand interval period of time. The peak demand charge is calculated as cents or dollars per kilowatt of actual demand. Such peak demand charges can be quite high as a percentage of the total utility charge over a particular billing period.

Owing to the increased use of peak demand charges by electrical utilities, large industrial consumers of electricity have begun investigating methods for reducing peak power demands from the electrical utility. Load shedding is one approach by which various noncritical electrical loads are automatically removed from a consumer facility's power distribution system during periods of high peak power demand. Peak shaving systems constitute an alternative to load shedding, whereby additional privately-owned generating capacity is utilized to absorb part of the consumer's electrical demand during peak demand times. This can be accomplished by a block approach, in which a local generating system provides all of the power required by certain portions of the consumer's requirements, or by operating a secondary generator in parallel with the electrical utility distribution system. In each of these approaches, the peak power demand recognized by the electrical utility is effectively reduced, thereby reducing the high peak demand charge associated with such power consumption.

Parallel operation of a secondary generating system is particularly advantageous because the electrical consumer can carefully control the amount of secondary power generated to coincide with the most economical operating conditions. Since the basic cost of generating electrical power utilizing a secondary generating system, as opposed to the raw utility cost for generating the same amount of power, is generally much higher, economics dictate that only that amount of power that will reduce the peak demand charges significantly should be produced. The exact equilibrium point varies according to a number of economic factors, for example, the cost of fuel for the secondary generating system, the capital cost for providing the generating system, the actual expected utility power demand during a particular part of the year in a seasonal operation, the actual utility rate structure, and various other factors.

The use of a secondary generating system in conjunction with the utility distribution system is also particularly advantageous for those industrial facilities already employing emergency standby generating systems. In such instances, additional capital expenditure to accomplish peak shaving is minimized because the generating equipment is already in place for emergency use. The same equipment is readily adaptable to the peak shaving application.

Various manufacturers already provide the commercial components necessary to accomplish basic peak shaving. Generator sets of various capacities are available from a number of manufacturers. Many of these generator sets are suitable for parallel utility operation when used in conjunction with appropriate transfer switches and controls. Control equipment supplied with the generator sets can maintain the secondary generator in synchronization with the utility power distribution system, and can control the output of the secondary electrical generator set in accordance with predetermined command signals.

In a typical application of such peak shaving equipment, the actual utility demand by the consumer is sensed and compared to a desired maximum utility demand. In response to the sensed demand exceeding the predetermined maximum demand, one or more generator sets are activated and used to reduce the actual demand to the predetermined demand. This continues until such time as the actual demand cannot be maintained at the predetermined level by the secondary generator, at which time the generator simply runs at full output with the actual utility demand again fluctuating, but offset by the amount of secondary power generated.

Existing systems do not optimize the amount of power produced by the secondary generating system in accordance with economic factors. Instead, such systems merely control to a single predetermined demand setpoint. This has proven to be an inefficient utilization of the secondary generating capacity, owing to the fact that economic factors change frequently according to the time of operation, the cost of fuel, and a number of other factors. In order to most fully realize the advantages of peak shaving, it is necessary to modify the amount of secondary power generated in response to a great number of such factors.

The present invention is directed to overcoming one or more of the problems as set forth above.

DISCLOSURE OF THE INVENTION

In one aspect of the present invention, an apparatus for reducing the peak electrical power demand of a predetermined operational unit from an electrical utility power distribution network is provided. A transducer substantially continuously senses the actual peak power demand of the operational unit from the utility power distribution network. The transducer produces a demand signal having a value responsive to the sensed actual peak power demand. A memory device controllably stores a plurality of control parameters including a demand setpoint. A logic device controllably connects the secondary electrical generator in parallel with the utility power distribution network in response to the value of the demand signal exceeding the value of the demand setpoint, and controls the secondary electrical generator to produce only the amount of power necessary to maintain the demand signal value at or below the demand setpoint value.

In a second aspect of the present invention, a method for reducing the peak electrical power demand of a predetermined operational unit from an electrical utility power distribution network by controllably operating at least one secondary electrical generator associated with the operational unit in parallel with the utility power distribution network is provided. The method includes the steps of sensing the actual peak power demand of the facility from the utility power distribution network and producing a demand signal having a value responsive to the sensed actual peak power demand. A plurality of control parameters including a demand setpoint are stored in a memory device. The secondary electrical generator is connected in parallel with the utility power distribution network in response to the value of the demand signal exceeding the value of the demand setpoint. The secondary electrical generator is controlled to produce only the amount of power necessary to maintain the demands signal value at or below the demand setpoint value.

The present invention provides a peak shaving system that optimizes the amount of power produced by a secondary electrical generator in accordance with a plurality of economic factors.

BRIEF DESCRIPTION OF THE DRAWINGS

For a better understanding of the present invention, reference may be made to the accompanying drawings, in which:

FIG. 2c is a waveform representing the amount of power that must be supplied to the representation of FIG. 2b to complete the demand curve of FIG. 2a;

BEST MODE FOR CARRYING OUT THE INVENTION

Figure 1:
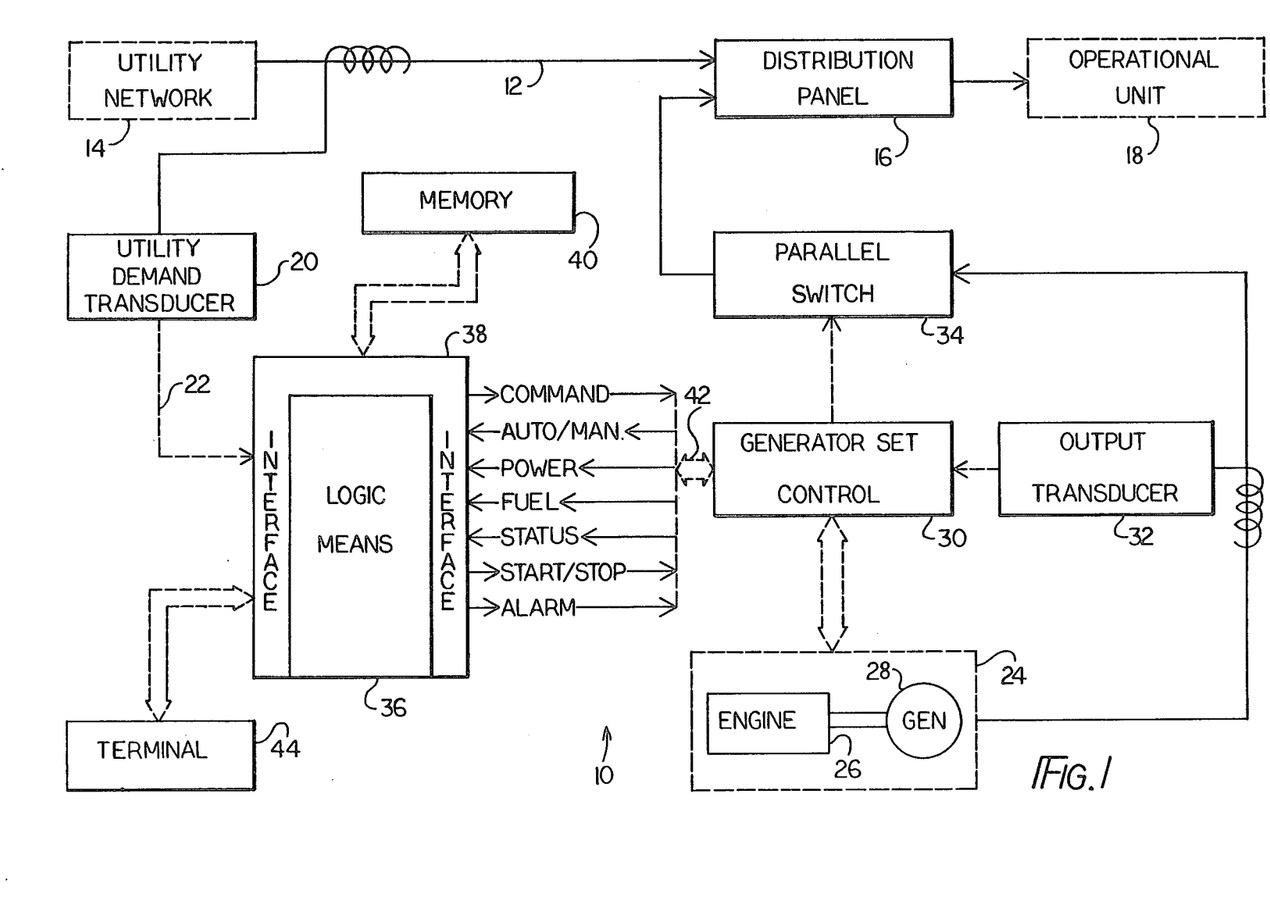
FIG. 1 is a schematized block diagram of one embodiment of the present invention.

Referring to the FIGS., and especially to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

A main power line 12 from a utility power distribution network 14 is connected to a consumer distribution panel 16. The distribution panel 16 supplies power from the utility network 14 to an operational unit 18. The operation of unit 18 is, for example, a closed electrical system consisting of a particular user facility or other limited load unit.

A transducer means 20 is connected to the line 12 in a manner sufficient to substantially continuously sense the actual peak power demand of the operational unit 18 from the utility network 14. The transducer means 20 produces a demand signal having a value responsive to the sensed actual peak power demand. In the preferred embodiment, the transducer means 20 includes a contact device arranged to produce an "open/closed" contact sequence in response to a predetermined amount of energy being sensed by the transducer means 20. Therefore, the demand signal produced on a transducer output line 22 is a series of pulses, with each complete pulse cycle indicating that a particular predetermined amount of energy has been delivered from the utility network 14 to the operational unit 18. The rate at which pulses are delivered from the transducer means 20 is indicative of the demand rate at which energy is being required.

A secondary electrical generator 24 includes an engine 26 connected to a stationary electrical generator 28. The secondary generator 24 is operated in response to commands from a generator control 30. Electrical power produced by the generator 24 is sensed by an output transducer 32 and delivered to a parallel switch means 34. The output transducer 32 is of similar design to the transducer means 20 and produces pulses responsive to the total amount of energy supplied by the generator 24.

The parallel switch means 34 is also connected to the generator control 30 and is adapted to connect the generator 24 in parallel with the utility network 14 in response to receiving a transfer command signal from the generator control 30. Therefore, in response to receiving the transfer command signal the switch means 34 is closed and the electrical power supplied to the distribution panel 16 is a combination of the electrical power produced by the generator 24 and the electrical power delivered from the utility network 14.

A logic means 36 is connected to an interface 38. The logic means 36 is, for example, a programmable controller or other form of computer based logic control. A memory means 40 is connected to the logic means 36 and is adapted to controllably store a plurality of control parameters including a predetermined demand setpoint value.

A data bus 42 is connected between the generator control 30 and the interface 38. The data bus 42 transfers signals, including command and status type signals, between the generator control 30 and the interface 38. The transducer means output line 22 is also connected to the interface 38, as is a computer terminal 44 or other communication device.

The generator control 30 is of conventional design and is adapted to operate the engine 26 and generator 28 in response to receiving particular command signals. In the preferred embodiment, the command signals are delivered from the logic means 36 through the interface 38 and the data bus 42 to the generator control 30. The command signals are sufficient to cause the generator control 30 to operate the generator 24 to produce a particular output power level to be delivered to the switch means 34.

The generator control 30 also performs various other functions. For example, fuel consumption and generator status information is delivered via the data bus 42 to the interface 38. The pulses indicating actual electrical power produced by the generator 24 received from the output transducer 32 are also delivered over the data bus 42 to the interface 38. An indication as to whether the generator control 30 is set to an automatic or manual mode is likewise delivered to the interface 38. "Start/Stop" signals and alarm condition signals are delivered from the logic means 36 through the interface 38 and the data bus 42 to the generator control 30.

The apparatus 10 is controllably responsive to a plurality of parametric data values. System parameters define the specific utility related pulse inputs, the characteristics of the utility rate system, and specific factors tailored to the operational unit 18 actual energy requirements. System parameters include, for example, a utility pulse constant which relates the pulses received from the transducer means 20 to an actual kilowatt hour value.

A plurality of predetermined power percentage factors are stored in the memory means 40, and include a set of constants that correspond to calculated percentages of the peak power generating ability of the generator 24 that can economically be used during a particular calendar or billing period. The predetermined demand setpoint is a starting power demand level at which peak shaving is to be initiated. A deadband defines a threshold value range above or below which additional peak shaving operations are to be performed.

During a billing year, the user typically observes peak demand levels which vary according to heating, cooling, and various processing requirements. During sequential billing periods, it is desirable to lower the setpoint at the beginning of each subsequent billing period so that full utilization of the computed peak shaving capacity can be realized. A downward monthly offset percentage factor is applied automatically to the setpoint value in order to reduce the setpoint of the previous billing period to better utilize the peak shaving capability during the upcoming billing period.

In addition, a time/date parameter permits synchronization of the apparatus 10 to the actual time and date. Utility tariff dependent parameters include starting hours for on-peak, partial-peak, and off-peak periods, starting periods for seasonal tariffs, and other time related utility factors. Each of these parameters is stored in the memory means 40, which, in the preferred embodiment, includes a battery back up system.

Generator specific parameters are also stored in the memory means 40. These parameters allow the apparatus 10 to be customized according to the particular generator 24 and generator control 30 utilized in the system. These parameters include the rated generator capacity in kilowatts, and the rate at which the generator 24 can be loaded, specified in kilowatts per second. The particular conversion factors relating to the kilowatt hours per pulse received from the output transducer 32 and the gallons of fuel per pulse received from a fuel transducer associated with the generator control 30 are also stored as generator parameters.

Assuming that the apparatus 10 has not been in use owing to having been newly installed or to failure of the battery back up system associated with the memory means 40, initialization is required. Upon initially applying power to the logic means 36, all parameters are established at predetermined values, and the apparatus 10 is automatically inhibited from performing peak shaving operations. Upon entry, via the terminal 44, of appropriate parametric values according to the actual system configuration, the logic means 36 is enabled and peak shaving operations can be initiated.

Figure 2A:
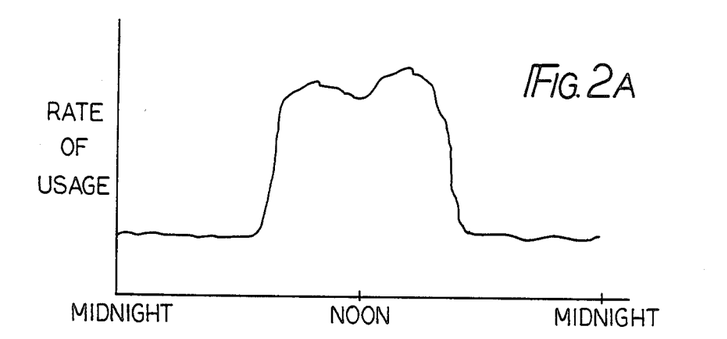
FIG. 2a is a waveform representing a typical power demand curve associated with a manufacturing facility.
Figure 2B:
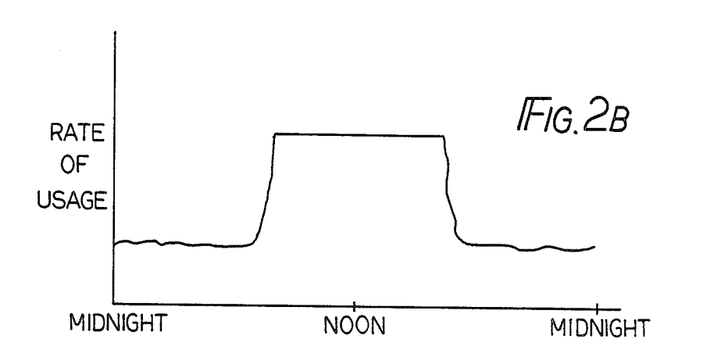
FIG. 2b is a waveform representing the power demand curve of FIG. 2a limited by a power demand limit setpoint.
Figure 2C:
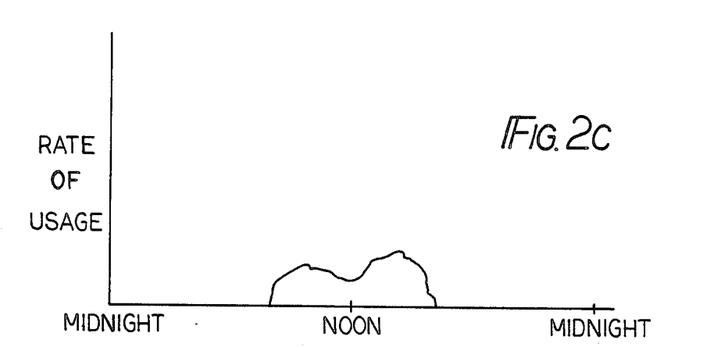

The waveform of FIG. 2a shows the unsuppressed demand curve of a typical operational unit 18 over the course of a single day. FIG. 3b shows the actual demand from the utility network 14 that is realized when all demand above the demand setpoint is successfully satisfied by peak shaving. FIG. 2c indicates the actual amount of power produced by the generator 24 and delivered to the operational unit 18 under the situation presented in FIGS. 2a and 2b, and actually represents the total suppressed demand.

Figure 3:
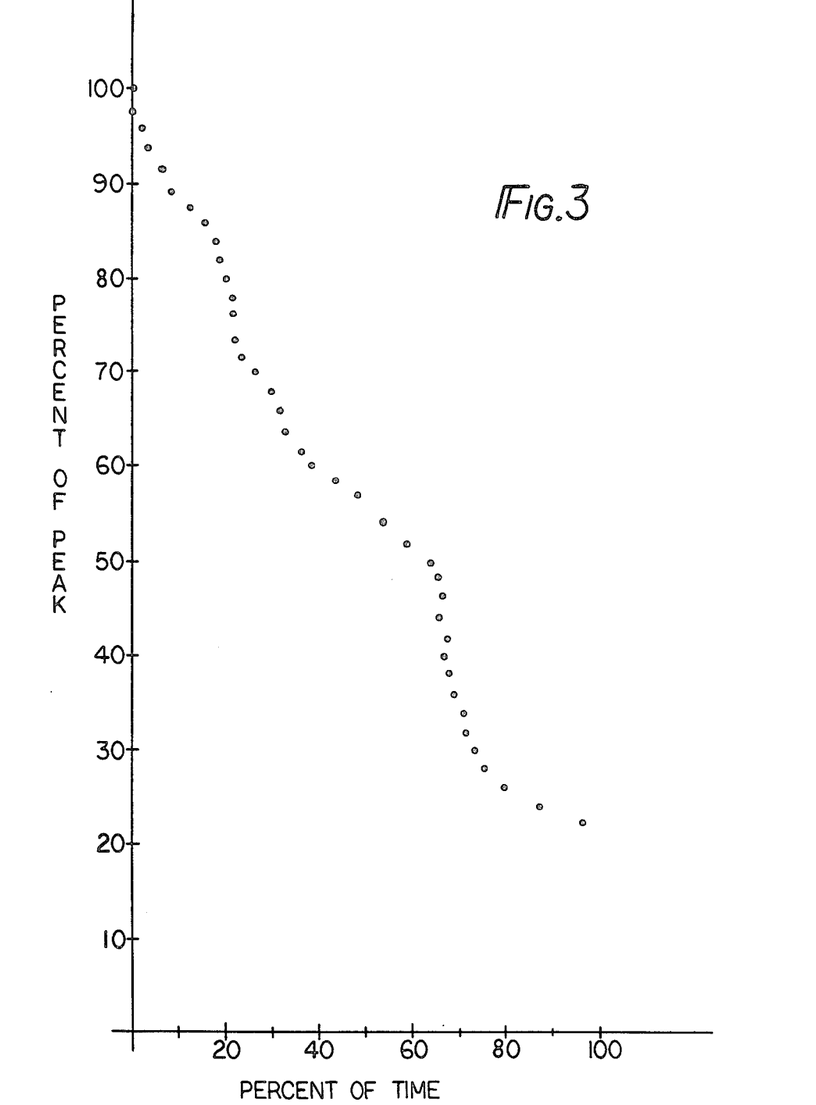
FIG. 3 is a graphical representation indicating the percent of time that the peak power demand from a technical industrial facility is at a particular percentage of the peak power demand.
Figure 4A:
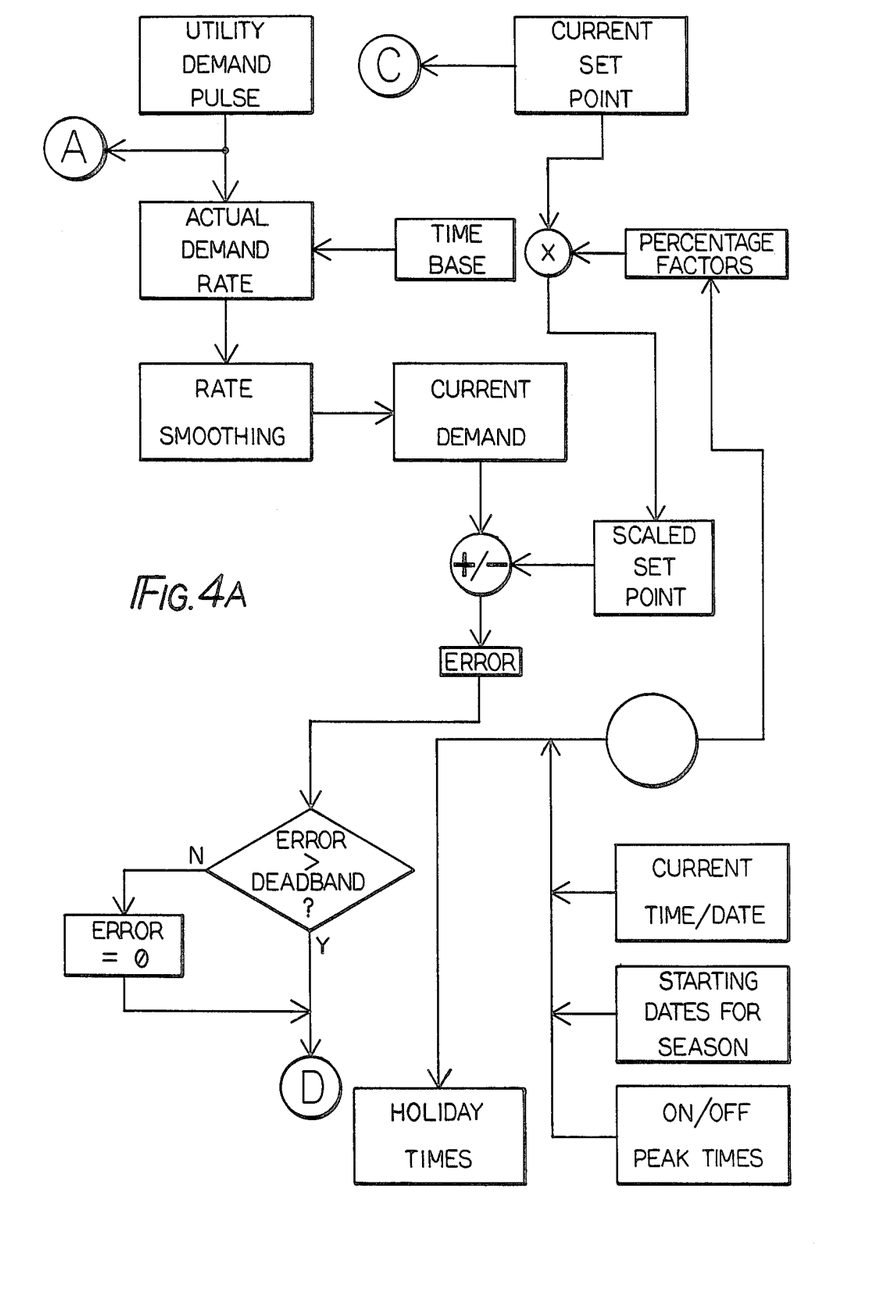
FIGS. 4a–4d are in combination a flowchart of software associated with an embodiment of the present invention.
Figure 4B:
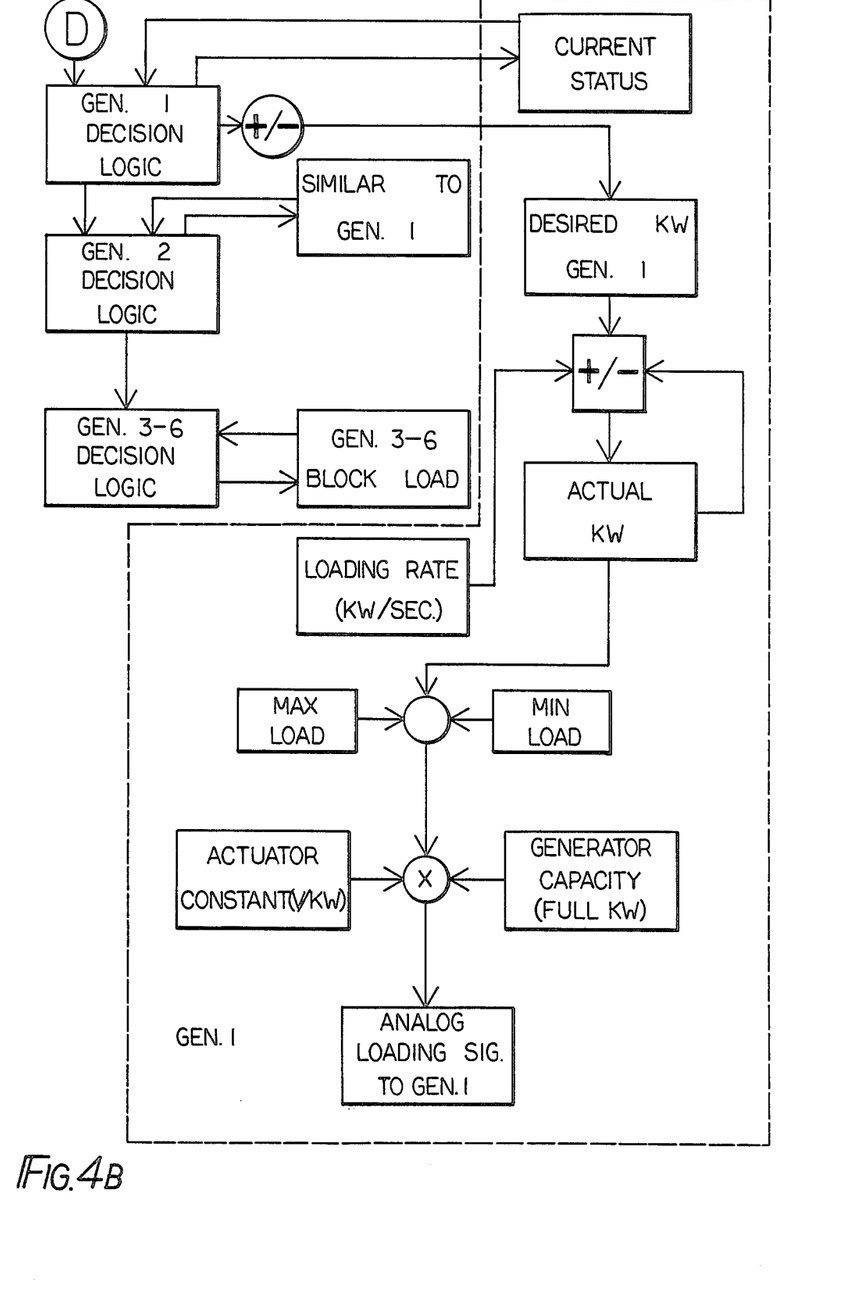
Figure 4C:
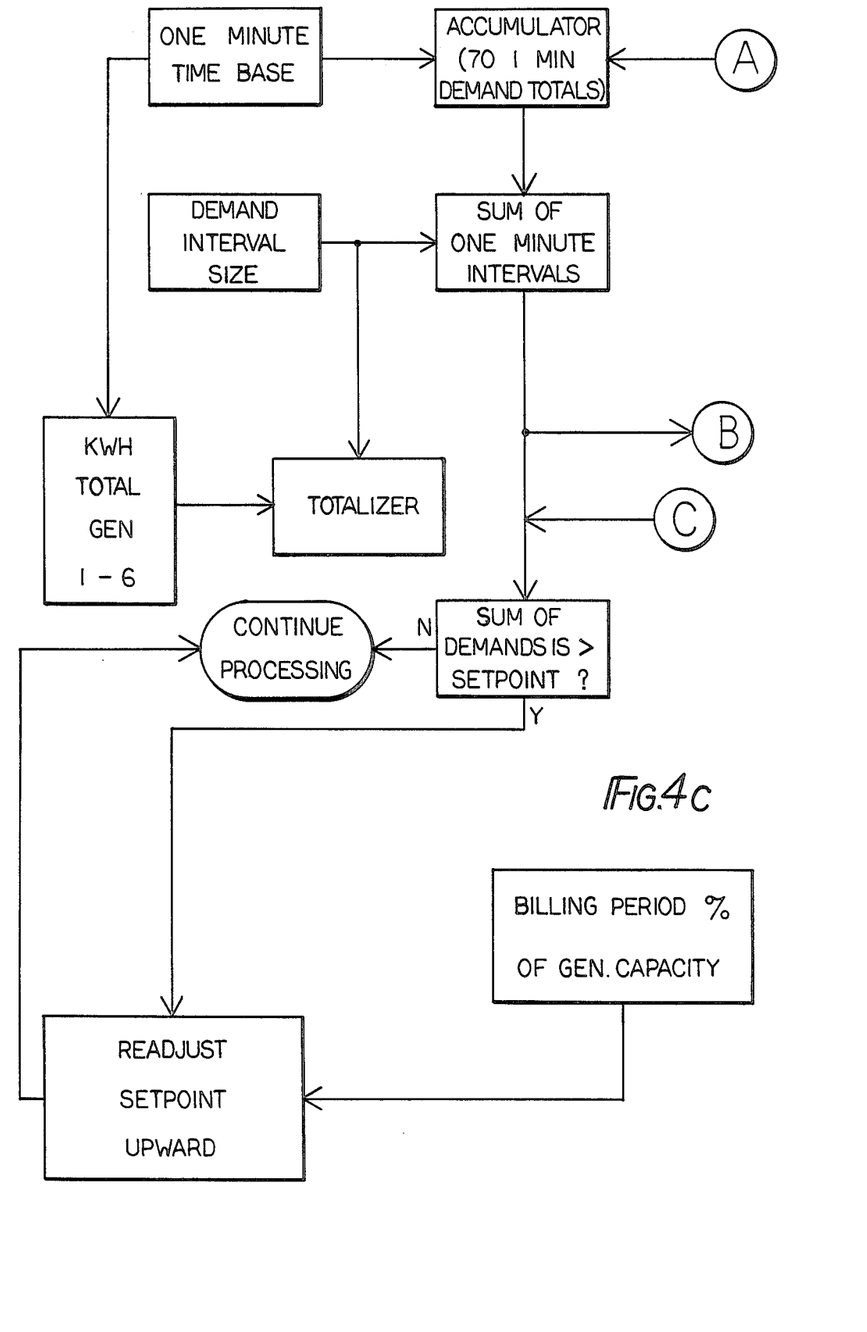
Figure 4D:
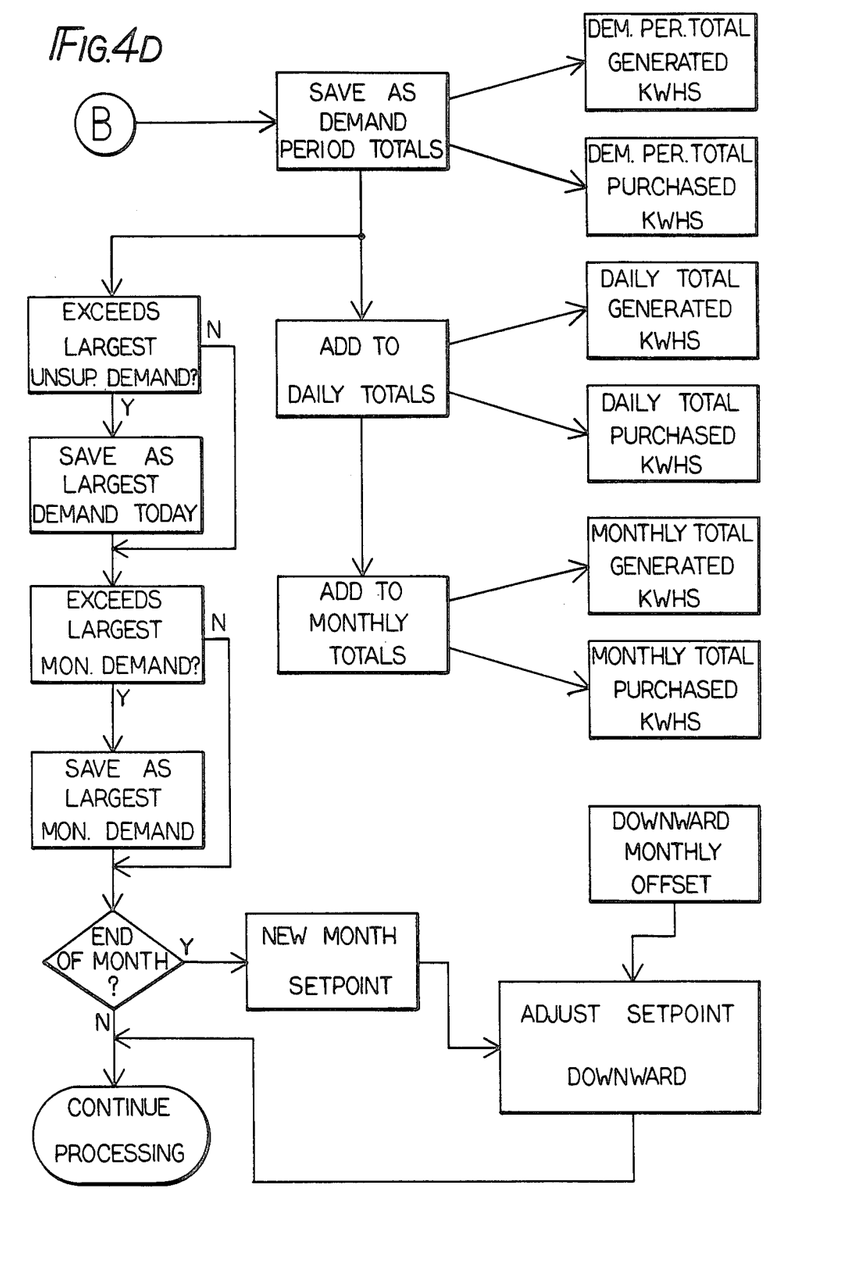

In FIG. 3, a preliminary analysis of the user's consumption of electricity results in a determination of the amount of time during a billing month spent at various demand levels. From this analysis, the savings achievable by replacing incrementally larger utility demand levels can be calculated. Such savings are offset by the increased operating costs associated with generating additional power to limit the demand. The net savings increases as small amounts of peak shaving are initially employed and decreases when too much of the demand is replaced. In other words, as more of the facility's demand is replaced, longer run times are encountered and higher operating costs result. If corresponding utility charges are not avoided, net savings decrease for increasing amounts of demand shaved.

Reference to the flowchart of FIG. 4a–d specifically defines the functional aspects of the apparatus 10. From this flowchart, a programmer of ordinary skill can develop a specific set of program instructions for a particular computer that performs the steps necessary to implement the instant invention. The following material elaborates on various key aspects of the flowchart.

The utility demand pulse is considered with respect to a time base and converted to a value representing the actual current power demand from the utility. This actual power demand is compared with the adjusted current setpoint and an error signal results. Assuming that the error signal is greater than a predetermined deadband amount, the system presents the error to a decision logic array from which various engine generator sets are controlled.

The most economic operating point varies for each billing period as the user's consumption pattern changes throughout the year. Seasonal requirements of heating, cooling, and other processes substantially affect the energy use pattern, and therefore the net savings realized. Therefore, this calculation is performed on each billing period and a different ideal operation point can result for each billing period.

This analysis results in twelve power percentage factors that reflect the best economic operating point for each billing month. Therefore, in the preferred embodiment, the maximum amount of power produced by the generator 24 is controllably variably limited to a predetermined percentage of the generator maximum power capacity in accordance with a preselected one of the plurality of predetermined power percentage factors. These predetermined power percentage factors are selected to customize the amount of power produced by the generator 24 to the particular requirements of the user's operational unit 18, and to various interrelated economic factors.

If the peak power demand of the operational unit 18 from the utility network 14 exceeds the limited power available from the secondary electrical generator 24, the apparatus 10 is unable to continue to maintain the actual peak power demand at or below the initial predetermined demand setpoint. Under these conditions, there no longer exists any economic justification for attempting to maintain the actual peak power demand at the predetermined setpoint for the duration of the particular demand billing cycle involved, and the logic means 36 responsively controllably modifies the value of the predetermined demand setpoint in order to reflect the changed circumstances. The modified demand setpoint value is increased by an amount equal to the difference between the predetermined percentage of the generator maximum power capacity and the actual peak power demand from the utility network 14, and is not again decreased for at least the duration of the respective predetermined period of time.

In one embodiment, the logic means 36 also periodically stores the maximum value of the actual peak power demand over predetermined intervals, e.g., daily or monthly, in the memory means 40. The stored information is utilized as a "moving average" to determine peak power demand trends, reflecting seasonal or other periodic variation in required power. The predetermined demand setpoint value is controllably periodically modified by the logic means 36, for example, at the end of each demand period, in response to the determined peak power demand trends. Therefore, the demand setpoint to which the apparatus 10 responds is periodically modified in response to actual experience based on utilization of the apparatus 10 in a particular operating environment. This permits the apparatus 10 to systematically function in the most efficient manner responsive to actual demand experience of a particular operational unit 18. This trend analysis can be used instead of or in conjunction with the periodic downward setpoint adjustment previously discussed.

The apparatus 10 also serves to accumulate data relative to the actual use and control of electrical energy. The accumulated data is available for monitoring and evaluation purposes via the terminal 44 or other communication device. For example, information relating to utility demand, total demand suppression, kilowatt hours produced by the generator 24, kilowatt hours imported from the utility network 14, system fuel utilization, and system efficiency can be computed and displayed at the user's request. With the addition of a conventional printing device, formal reports can be generated by the apparatus 10.

Should any of the signals monitored by the logic means 36 indicate a fault condition, appropriate responses are delivered to the generator control 30 to cause the generator 24 to shut down or take other appropriate action. In addition, the logic means 36 can deliver various alarm signals to annunciators of conventional design.

Industrial Applicability

Operation of the apparatus 10 is best described in relation to its use in conjunction with an operational unit 18, for example, an industrial consumer of electrical power.

The preferred embodiment of the instant invention makes provision for a plurality of generator set devices. One or more of these generator sets can be adapted for parallel operation with a utility hour distribution network. Others of the generator sets can be of a block load design wherein activation of the generator set entirely services the needs of a particular discrete portion of a user's energy requirements. In any event, the described system can be as simple as a single parallel generator set system or as complex as a plurality of combined parallel and block type systems.

In conjunction with the foregoing, it should be noted that the flowchart provided in FIGS. 4a–d of the preferred embodiment of the instant invention includes a number of discrete subsets, one or more of which can be omitted from a particular application of the peak shaving system while still utilizing the remainder of the computer program. For example, if some of the record keeping functions set forth in the flowchart and in the foregoing description are not required by a particular installation, only the necessary reporting functions need be utilized. Therefore, the particular computer program embodied in a specific installation may be less than the system described in FIGS. 4a–d.

A particularly advantageous configuration of the apparatus 10 utilizes a pre-existing secondary electrical generator 24, for example, an emergency standby generator. Such emergency devices are commonly employed in industry today, and typically operate only in response to failure of the prime power supply from the utility network 14. However, when utilized in conjunction with the apparatus 10, such standby generators are capable of performing peak shaving operations as described above. In the event that an emergency condition occurs, the generator control 30 delivers this information to the logic means 36, which in turn disables the peak shaving function and restores the emergency generator to a pure emergency configuration.

Other variations in the basic system described above will be appreciated by those skilled in the art. Such alternative embodiments are believed within the scope of the appended claims.

Other aspects, objects, advantages, and uses of this invention can be obtained from a study of the drawings, the disclosure, and the appended claims.

I claim:

1. Apparatus for reducing the peak electrical power demand of a predetermined operational unit from an electrical utility power distribution network by controllably operating at least one secondary electrical generator associated with said operational unit in parallel with said utility power distribution network, said secondary electrical generator including control means for operating said secondary electrical generator in response to receiving command signals, and switch means for connecting said secondary electrical generator in parallel with said utility power distribution network in response to receiving a transfer command signal, comprising:

transducer means for substantially continuously sensing the actual peak power demand of said operational unit from said utility power distribution network and producing a demand signal having a value responsive to said sensed actual peak power demand;

memory means for controllably storing a plurality of control parameters including a predetermined demand setpoint value and plurality of predetermined power percentage factors;

means for receiving said demand signal and controllably producing said transfer command signal and connecting said secondary electrical generator in parallel with said utility power distribution network in response to the value of said demand signal exceeding the value of said predetermined demand setpoint;

means for producing predetermined command signals and controlling said secondary electrical generator to produce only the amount of power necessary to maintain said demand signal value at or below said predetermined setpoint value; and means for controllably variably limiting the maximum amount of power produced by said secondary electrical generator to a predetermined percentage of the secondary electrical generator maximum power capacity in accordance with a preselected one of said plurality of predetermined power percentage factors.

2. Apparatus, as set forth in claim 1, wherein the values of respective ones of said predetermined percentage factors are established according to respective predetermined periods of time.

3. Apparatus, as set forth in claim 2, wherein each of said predetermined periods of time represents a respective utility demand cycle.

4. Apparatus, as set forth in claim 2, wherein each of said plurality of predetermined percentage factors is established in response to economic factors associated with the respective predetermined period of time.

5. Apparatus, as set forth in claim 2, wherein said logic means controllably modifies the value of said predetermined demand setpoint in response to the predetermined percentage of the secondary electrical generator maximum power capacity being insufficient to prevent said demand signal value from exceeding said predetermined demand setpoint value.

6. Apparatus, as set forth in claim 5, wherein said modified demand setpoint value is increased by an amount equal to the difference between the predetermined percentage of the secondary electrical generator maximum power capacity and said actual peak power demand from said utility power distribution network, and is not decreased for at least the duration of the instant respective predetermined period of time.

7. Apparatus, as set forth in claim 1, wherein said logic means periodically stores the maximum value of said actual peak power demand over predetermined intervals, determines peak power demand trends in response to said stored values, and controllably periodically modifies said predetermined demand setpoint value in response to said determined peak power demand trends.

8. Apparatus, as set forth in claim 7, wherein said demand setpoint value is adjusted upward and downward in response to said determined peak power demand trends.

9. Apparatus, as set forth in claim 8, wherein the amount by which said demand setpoint value is modified in response to said determined peak power demand trends is limited to a predetermined fractional portion of the actual amount necessary to fully adjust for the determined peak power demand trends.

10. Apparatus for reducing the peak power demand of a predetermined operational unit from an electrical utility power distribution network by controllably operating at least one secondary electrical generator associated with said operational unit in parallel with said utility power distribution network, said secondary electrical generator including control means for operating said secondary electrical generator in response to receiving command signals, and switch means for connecting said secondary electrical generator in parallel with said utility power distribution network in response to receiving a transfer command signal, comprising:

transducer means for substantially continuously sensing the actual peak power demand of said operational unit from said utility power distribution network and producing a demand signal having a value responsive to said sensed actual peak power demand;

memory means for controllably storing a plurality of control parameters including a predetermined demand setpoint value;

means for receiving said demand signal and controllably producing said transfer command signal and connecting said secondary electrical generator in parallel with said utility power distribution network in response to the value of said demand signal exceeding the value of said predetermined demand setpoint;

means for producing predetermined command signals and controlling said secondary electrical generator to produce only the amount of power necessary to maintain said demand signal value at or below said predetermined setpoint value; and means for controllably modifying the value of said predetermined demand setpoint in response to the amount of power available from said secondary electrical generator being insufficient to prevent said demand signal value from exceeding said predetermined demand setpoint value.

11. Apparatus, as set forth in claim 10, wherein said modified demand setpoint value is increased by an amount equal to the difference between the amount of power produced by said secondary electrical generator and said actual peak power demand from said utility power distribution network, and is not decreased for at least the duration of the instant respective predetermined period of time.

12. Apparatus, as set forth in claim 10, wherein said logic means periodically stores the maximum value of said actual peak power demand over predetermined intervals, determines peak power demand trends in response to said stored values, and controllably periodically modifies said predetermined demand setpoint value in response to said determined peak power demand trends.

13. Apparatus, as set forth in claim 12, wherein said demand setpoint value is adjusted upward and downward in response to said determined peak power demand trends.

14. Apparatus, as set forth in claim 13, wherein the amount by which said demand setpoint value is modified in response to said determined peak power demand trends is limited to a predetermined fractional portion of the actual amount necessary to fully adjust for the determined peak power demand trends.

15. Apparatus, as set forth in claim 10, wherein said logic means controllably variably limits the maximum amount of power produced by said secondary electrical generator to a predetermined percentage of the secondary electrical generator maximum power capacity in accordance with a preselected one of a plurality of predetermined power percentage factors.

16. Apparatus for reducing the peak power demand of a predetermined operational unit from an electrical utility power distribution network by controllably operating at least one secondary electrical generator associated with said operational unit in parallel with said utility power distribution network, said secondary electrical generator including control means for operating said secondary electrical generator in response to receiving command signals, and switch means for connecting said secondary electrical generator in parallel with said utility power distribution network in response to receiving a transfer command signal, comprising:

transducer means for substantially continuously sensing the actual peak power demand of said operational unit from said utility power distribution network and producing a demand signal having a value responsive to said sensed actual peak power demand;

memory means for controllably storing a plurality of control parameters including a predetermined demand setpoint value;

means for receiving said demand signal and controllably producing said transfer command signal and responsively connecting said secondary electrical generator in parallel with said utility power distribution network in response to the value of said demand signal exceeding the value of said predetermined demand setpoint;

means for producing predetermined command signals and controlling said secondary electrical generator to produce only the amount of power necessary to maintain said demand signal value at or below said predetermined demand setpoint value; and means for periodically storing the maximum value of said actual peak power demand trends in response to said stored values, and controllably periodically modifying said predetermined demand setpoint value in response to said determined peak power demand trends.

17. Apparatus, as set forth in claim 16, wherein said demand setpoint value is adjusted upward and downward in response to said determined peak power demand trends.

18. Apparatus, as set forth in claim 17, wherein the amount by which said demand setpoint value is modified in response to said determined peak power demand trends is limited to a predetermined fractional portion of the actual amount necessary to fully adjust for the determined peak power demand trends.

19. Apparatus, as set forth in claim 16, wherein said logic means controllably modifies the value of said predetermined demand setpoint in response to the amount of power available from said secondary electrical generator being insufficient to prevent said demand signal value from exceeding said predetermined demand setpoint value.

20. Apparatus, as set forth in claim 19, wherein said modified demand setpoint value is increased by an amount equal to the difference between the amount of power produced by said secondary electrical generator and said actual peak power demand from said utility power distribution network, and is not decreased for at least the duration of the instant respective predetermined period of time.

21. Apparatus, as set forth in claim 16, wherein said logic means controllably variably limits the maximum amount of power produced by said secondary electrical generator to a predetermined percentage of the secondary electrical generator maximum power capacity in accordance with a preselected one of a plurality of predetermined power percentage factors.

22. Apparatus for reducing the peak power demand of a predetermined operational unit from an electrical utility power distribution network by controllably operating at least one secondary electrical generator associated with said operational unit in parallel with said utility power distribution network, said secondary electrical generator including control means for operating said secondary electrical generator in response to receiving command signals, and switch means for connecting said secondary electrical generator in parallel with said utility power distribution network in response to receiving a transfer command signal, comprising:

transducer means for substantially continuously sensing the actual peak power demand of said operational unit from said utility power distribution network and producing a demand signal having a value responsive to said sensed actual peak power demand;

memory means for controllably storing a plurality of control parameters including a predetermined demand setpoint value and a plurality of predetermined power percentage factors;

means for receiving said demand signal and controllably producing said transfer command signal and responsively connecting said secondary electrical generator in parallel with said utility power distribution network in response to the value of said demand signal exceeding the value of said predetermined demand setpoint;

means for producing predetermined command signals and controlling said secondary electrical generator to produce only the amount of power necessary to maintain said demand signal value at or below said predetermined demand setpoint value;

means for controllably variably limiting the maximum amount of power produced by said secondary electrical generator to a predetermined percentage of the secondary electrical generator maximum power capacity in accordance with a preselected one of said plurality of predetermined power percentage factors;

means for controllably modifying the value of said predetermined demand setpoint in response to the predetermined percentage of the secondary electrical generator maximum power capacity being insufficient to prevent said demand signal value from exceeding said predetermined demand setpoint value; and means for periodically storing the maximum value of said actual peak power demand over predetermined intervals, determining peak power demand trends in response to said stored values, and controllably periodically modifying said predetermined demand setpoint value in response to said determined peak power demand trends.

23. Apparatus, as set forth in claim 22, wherein said modified demand setpoint value is increased by an amount equal to the difference between the predetermined percentage of the secondary electrical generator maximum power capacity and said actual peak power demand from said utility power distribution network, and is not decreased for at least the duration of the instant respective predetermined period of time.

24. Apparatus, as set forth in claim 22, wherein said demand setpoint value is adjusted upward and downward in response to said determined peak power demand trends.

25. Apparatus, as set forth in claim 24, wherein the amount by which said demand setpoint value is modified in response to said determined peak power demand trends is limited to a predetermined fractional portion of the actual amount necessary to fully adjust for the determined peak power demand trends.

26. Apparatus, as set forth in claim 22, wherein the values of respective ones of said predetermined percentage factors are established according to respective predetermined periods of time.

27. Apparatus, as set forth in claim 26, wherein each of said predetermined periods of time represents a respective utility demand cycle.

28. Apparatus, as set forth in claim 27, wherein each of said plurality of predetermined percentage factors is established in response to economic factors associated with the respective predetermined period of time.

29. A method for reducing the peak electrical power demand of a predetermined operational unit from an electrical utility power distribution network by controllably operating at least one secondary electrical generator associated with said operational unit in parallel with said utility power distribution network, said secondary electrical generator including switch means for connecting said secondary electrical generator in parallel with said utility power distribution network in response to receiving a transfer command signal, comprising the steps of:

sensing the actual peak power demand of said operational unit from said utility power distribution network;

producing a demand signal having a value responsive to said sensed actual peak power demand;

storing a plurality of control parameters including a predetermined demand setpoint value and a plurality of predetermined power percentage factors;

producing said transfer command signal and responsively connecting said secondary electrical generator in parallel with said utility power distribution network in response to the value of said demand signal exceeding the value of said predetermined demand setpoint;

controlling said secondary electrical generator to produce only the amount of power necessary to maintain said demand signal value at or below said predetermined demand setpoint value; and limiting the maximum amount of power produced by said secondary electrical generator to a predetermined percentage of the secondary electrical generator maximum power capacity in accordance with a preselected one of said plurality of predetermined power percentage factors.

30. A method, as set forth in claim 29, including the step of controllably modifying the value of said predetermined demand setpoint in response to the predetermined percentage of the secondary electrical generator maximum power capacity being insufficient to prevent said demand signal value from exceeding said predetermined demand setpoint value.

31. A method, as set forth in claim 29, including the steps of periodically storing the maximum value of said actual peak power demand over predetermined intervals;

determining peak power demand trends in response to said stored values; and controllably periodically modifying said predetermined demand setpoint value in response to said determined peak power demand trends.

32. A method for reducing the peak electrical power demand of a predetermined operational unit from an electrical utility power distribution network by controllably operating at least one secondary electrical generator associated with said operational unit in parallel with said utility power distribution network, said secondary electrical generator including switch means for connecting said secondary electrical generator in parallel with said utility power distribution network in response to receiving a transfer command signal, comprising the steps of:

sensing the actual peak power demand of said operational unit from said utility power distribution network;

producing a demand signal having a value responsive to said sensed actual peak power demand;

storing a plurality of control parameters including a predetermined demand setpoint value;

producing said transfer command signal and responsively connecting said secondary electrical generator in parallel with said utility power distribution network in response to the value of said demand signal exceeding the value of said predetermined demand setpoint;

controlling said secondary electrical generator to produce only the amount of power necessary to maintain said demand signal value at or below said predetermined demand setpoint value; and controllably modifying the value of said predetermined demand setpoint in response to the amount of power available from said secondary electrical generator being insufficient to prevent said demand signal value from exceeding said predetermined demand setpoint value.

33. A method, as set forth in claim 32, including the steps of periodically storing the maximum value of said actual peak power demand over predetermined intervals;

determining peak power demand trends in response to said stored values, and controllably periodically modifying said predetermined demand setpoint value in response to said determined peak power demand trends.

34. A method, as set forth in claim 32, including the step of limiting the maximum amount of power produced by said secondary electrical generator to a predetermined percentage of the secondary electrical generator maximum power capacity in accordance with a preselected one of a plurality of predetermined power percentage factors.

35. A method for reducing the peak electrical power demand of a predetermined operational unit from an electrical utility power distribution network by controllably operating at least one secondary electrical generator associated with said operational unit in parallel with said utility power distribution network, said secondary electrical generator including switch means for connecting said secondary electrical generator in parallel with said utility power distribution network in response to receiving a transfer command signal, comprising the steps of:
- sensing the actual peak power demand of said operational unit from said utility power distribution network;
- producing a demand signal having a value responsive to said sensed actual peak power demand;
- storing a plurality of control parameters including a predetermined demand setpoint value;
- producing said transfer command signal and responsively connecting said secondary electrical generator in parallel with said utility power distribution network in response to the value of said demand signal exceeding the value of said predetermined demand setpoint;
- controlling said secondary electrical generator to produce only the amount of power necessary to maintain said demand signal value at or below said predetermined demand setpoint value;
- periodically storing the maximum value of said actual peak power demand over predetermined intervals;
- determining peak power demand trends in response to said stored values; and
- controllably periodically modifying said predetermined demand setpoint value in response to said determined peak power demand trends.

36. A method, as set forth in claim 35, including the step of controllably modifying the value of said predetermined demand setpoint in response to the amount of power available from said secondary electrical generator being insufficient to prevent said demand signal value from exceeding said predetermined demand setpoint value.

37. A method, as set forth in claim 35, including the step of limiting the maximum amount of power produced by said secondary electrical generator to a predetermined percentage of the secondary electrical generator maximum power capacity in accordance with a preselected one of a plurality of predetermined power percentage factors.

38. A method for reducing the peak electrical power demand of a predetermined operational unit from an electrical utility power distribution network by controllably operating at least one secondary electrical generator associated with said operational unit in parallel with said utility power distribution network, said secondary electrical generator including switch means for connecting said secondary electrical generator in parallel with said utility power distribution network in response to receiving a transfer command signal, comprising the steps of:
- sensing the actual peak power demand of said operational unit from said utility power distribution network;
- producing a demand signal having a value responsive to said sensed actual peak power demand;
- storing a plurality of control parameters including a predetermined demand setpoint value and a plurality of predetermined power percentage factors;
- producing said transfer command signal and responsively connecting said secondary electrical generator in parallel with said utility power distribution network in response to the value of said demand signal exceeding the value of said predetermined demand setpoint;
- controlling said secondary electrical generator to produce only the amount of power necessary to maintain said demand signal value at or below said predetermined demand setpoint value;
- limiting the maximum amount of power produced by said secondary electrical generator to a predetermined percentage of the secondary electrical generator maximum power capacity in accordance with a preselected one of said plurality of predetermined power percentage factors;
- modifying the value of said predetermined demand setpoint in response to the predetermined percentage of the secondary electrical generator maximum power capacity being insufficient to prevent said demand signal value from exceeding said predetermined demand setpoint value;
- periodically storing the maximum value of said actual peak power demand over predetermined intervals;
- determining peak power demand trends in response to said stored values; and
- controllably periodically modifying said predetermined demand setpoint value in response to said determined peak power demand trends.

* * * * *